United States Patent
Acheff

(10) Patent No.: US 10,429,555 B2
(45) Date of Patent: Oct. 1, 2019

(54) PHOTOCHROMIC HEADLAMP

(71) Applicant: Ben George Acheff, Valparaiso, IN (US)

(72) Inventor: Ben George Acheff, Valparaiso, IN (US)

(*) Notice: Subject to any disclaimer, the term of this patent is extended or adjusted under 35 U.S.C. 154(b) by 30 days.

(21) Appl. No.: 15/624,017

(22) Filed: Jun. 15, 2017

(65) Prior Publication Data

US 2017/0363787 A1    Dec. 21, 2017

Related U.S. Application Data

(60) Provisional application No. 62/350,441, filed on Jun. 15, 2016, provisional application No. 62/414,267, filed on Oct. 28, 2016.

(51) Int. Cl.

| | | |
|---|---|---|
| *G02B 5/23* | (2006.01) |
| *G02B 1/04* | (2006.01) |
| *B60Q 1/04* | (2006.01) |
| *F21V 9/40* | (2018.01) |
| *F21S 41/00* | (2018.01) |
| *F21S 43/20* | (2018.01) |
| *F21S 41/20* | (2018.01) |
| *G02B 19/00* | (2006.01) |
| *F21S 43/00* | (2018.01) |
| *F21S 41/125* | (2018.01) |

(52) U.S. Cl.
CPC .................. *G02B 5/23* (2013.01); *B60Q 1/04* (2013.01); *F21S 41/00* (2018.01); *F21S 41/28* (2018.01); *F21S 41/285* (2018.01); *F21S 43/255* (2018.01); *F21V 9/40* (2018.02); *G02B 1/041* (2013.01); *G02B 19/0028* (2013.01); *G02B 19/0047* (2013.01); *F21S 41/125* (2018.01); *F21S 43/00* (2018.01); *G02B 1/04* (2013.01)

(58) Field of Classification Search
CPC . F21V 9/40; F21S 41/00; F21S 41/125; F21S 41/13; F21S 41/28; F21S 41/285; F21S 41/20; F21S 41/30; F21S 43/00; F21S 43/255; B60Q 1/04; G02B 1/04; G02B 1/041; G02B 5/23; G02B 19/0028; G02B 19/0047; B60R 1/083; G02F 1/0126
USPC ............... 359/241, 244, 604, 872, 871, 843; 362/487
See application file for complete search history.

(56) References Cited

U.S. PATENT DOCUMENTS

| | | | | |
|---|---|---|---|---|
| 5,373,392 A * | 12/1994 | Bala | .................... | B60R 1/083 359/241 |
| 5,581,090 A * | 12/1996 | Goudjil | .................... | G01J 1/50 250/372 |
| 6,536,828 B2 * | 3/2003 | Love | .................... | B60J 3/04 296/96.19 |
| 7,044,614 B2 * | 5/2006 | Levy | .................... | G06F 1/1616 250/483.1 |
| 7,798,659 B2 * | 9/2010 | Englander | .................... | B60R 1/083 359/843 |
| 2009/0009874 A1 * | 1/2009 | Englander | .................... | B60R 1/083 359/604 |

(Continued)

*Primary Examiner* — Loha Ben
(74) *Attorney, Agent, or Firm* — Richards Patent Law, P.C.

(57) ABSTRACT

An automobile headlamp comprising a light source; a photochromic lens; and a one-way mirror positioned between the light source and the photochromic lens such that when viewing the light source through the photochromic lens, the one-way mirror conceals at least a portion of the light source.

12 Claims, 6 Drawing Sheets

(56) References Cited

U.S. PATENT DOCUMENTS

2009/0073590 A1* 3/2009 Englander .............. B60R 1/083
                                                    359/872
2018/0306401 A1* 10/2018 Robinson ............. B60Q 1/0023
2018/0306402 A1* 10/2018 Robinson ................ F21S 41/43

* cited by examiner

PHOTOCHROMIC HEADLAMP

BACKGROUND OF THE INVENTION

The present subject matter relates generally to vehicle headlamps. More specifically, the present invention relates to headlamps which are concealed via photochromic lenses and half-silvered mirrors.

Hidden headlamps, more commonly known as "hideaway headlamps", were a widely popular automotive feature for much of the 20$^{th}$ century (1930s-1990s). Car manufacturers, from racing staples such as Aston Martin and Maserati to family favorites like Honda and Buick, embraced hidden headlamps because they gave cars a popular sleek and sporty design. Hidden headlamps were first introduced on the Cord 810 (produced in 1936). On the Cord and other early models, each headlamp unit was attached to a separate crank; the right crank controlled the car's right-side headlamp while the left crank controlled the car's left-side headlamp. When the headlamps were needed the driver turned each crank by hand, an arduous process on cars with heavy lamps. Turning the cranks one direction caused the headlamps to rise from their respective compartments and become visible, while turning the cranks the opposite direction lowered the lamps, making them vanish into their respective compartments.

Later versions of hidden headlamps advanced technologically to employ vacuum operated systems. Vacuum operated systems regularly failed however, because the systems inevitably lost pressure over time, ruining the operating mechanism.

Hand cranks and vacuum tubes eventually evolved into electric motors and while the motors were an improvement, they often malfunctioned and needed frequent repairs. Cold climates wreaked havoc, freezing the motors, while storms, with high winds, impacted lamps' abilities to rise and fall. Because of the problems with every incarnation of the hidden headlamp, the feature became obsolete. In 2004 the C5 Corvette and Lotus Esprit became the last mass-produced cars with hidden headlamps. Ultimately, moving parts were an Achilles heel of hidden headlamps: vacuum tubes broke, motors malfunctioned, and cranks failed.

Accordingly, there is a need for a new type of hidden headlamp, as described herein.

BRIEF SUMMARY OF THE INVENTION

To meet the needs described above and others, the present disclosure provides a hidden vehicle lamp which employs photochromic lenses and half-silvered mirrors to hide the headlamp when not in use.

Some embodiments of this invention employ a light source placed behind a one-way mirror, to project visible light through a photochromic lens. By employing a photochromic lens placed in front of a one-way (half-silvered) mirror, light can be projected through both items to provide illumination for use in automobile headlamps and headlamp assemblies.

One embodiment of this invention features a photochromic lens; an optical lens that darkens upon exposure to specific types of light of sufficient intensity (most commonly ultraviolet (UV) radiation). In the absence of activating (UV) light, the lens transitions from a semi-opaque state to a transparent state. Such lenses may be made of glass, polycarbonate, or any other suitable material including other types of plastic. The original use of photochromic lenses was to change the tint of eyeglass lenses in response to exposure to the sun. While use of such lenses has made its way into vehicles, photochromic lenses, or more accurately, photochromic glass used in automotive applications, are typically intended to prevent UV damage to exposed materials below the glass (oxidation of plastic, fading, etc.). However, in the present invention, the change in tint enabled by photochromic glass is enhanced, in part, by use of dye color formulations. Using dye formulations enables one to render the outer face of a headlamp uniform in color with respect to the rest of the automobile's finish, making the headlamps "invisible" or at least less apparent than traditional headlights.

While driving at night, the lack of UV exposure from sunlight allows the lenses to transition from opaque, to translucent, to semi-transparent or fully transparent. This can be achieved with the correct blend of photochromic dyes.

To further increase concealment of the light source, in some embodiments of this invention, a one-way mirror is used. A one-way mirror, or "half-silvered" mirror, is a sheet of glass or plastic with a transparently thin coating of metal, deposited on one side of the mirror. Usually, the metal deposited in modern times is aluminum deposited from aluminum vapor. The mirror is partially reflective and partially transparent and when one side of the mirror is brightly lit and the other is dark, the mirror allows viewing from the darkened side but not vice versa.

An automobile headlamp comprising a light source, a photochromic lens, and a one-way mirror positioned between the light source and the photochromic lens such that when viewing the light source through the photochromic lens, the one-way mirror conceals at least a portion of the light source. The automobile headlamp may further include a housing including an opening, the housing surrounds the one-way mirror and the photochromic lens is located along the opening such that light emitted from the light source passes through the one-way mirror and exits the housing through the photochromic lens. This housing may also include a reflective lining.

The photochromic lens mentioned above may be activated by ultraviolet light to increase its opacity. When the photochromic lens is activated and its opacity increased, the color of the photochromic lens may match a color of an automobile body into which the automobile headlamp is mounted. The light source and light emitted from the light source may also match a color of an automobile body into which the automobile headlamp is mounted.

Another embodiment of the present invention may be described as an automobile headlamp installed in an automobile comprising a light source positioned to emit light through a photochromic lens, wherein when the photochromic lens is activated to increase its opacity, a color of the photochromic lens matches a color of an automobile body into which the automobile headlamp is mounted. This embodiment may also feature a housing with a reflective lining and further include a one-way mirror positioned between the light source and the photochromic lens which partially or fully conceal the light source. The photochromic lens may be activated by ultraviolet light to increase its opacity and when the lens turns opaque it may be colored to match the automobile body to which is it mounted. The color of the light source and color of light emitted from the light source may also match the automobile body to which is it mounted.

While photochromic lenses typically degrade over a short period of time; usually 24-30 months (this is caused by the number of times the lens transitions from semi-opaque to translucent to transparent) recent innovation has led to the development of photochromic dyes that may last as long as 30 years. Few people keep cars as long as three decades and headlamps are typically changed out more frequently than this as they burn out or the lenses oxidize. A headlamp assembly would only need to have a usable life of 5-10 years, making photochromic lenses viable for use in automobile headlamps.

The photochromic lens, as stated previously, provides a transition effect, which can mimic the appearance of a headlight not being present on the vehicle; the half-silvered mirror further shields the hardware (headlight bulb) from appearance when not in use. This concealment creates the appearance of "hide-away headlights", but with no moving parts. This lack of moving parts solves the long-standing Achilles heel of hide-away lamps.

Other applications of the invention above may involve concealing other vehicle lights (e.g., the rear tail lights, etc.) and can also be adapted into existing vehicle headlamps by replacing portions or the entirety of a vehicle's headlamp assembly. The technology may also be built into replacement front ends for existing vehicles and enable manufacturers to design front ends with new and innovative designs. Such designs can remove unsightly "seams" or lines, depressions, and outcroppings created by the space required for modern vehicle lights.

As a side note, the term "vehicle" may include, but is not limited to, any mobile machine that transports people or cargo. Such machines may include: wagons, bicycles, motor vehicles (motorcycles, cars, trucks, buses), railed vehicles (trains, trams), watercraft (ships, boats, jet skis), snowmobiles, aircraft, spacecraft, and military vehicles.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
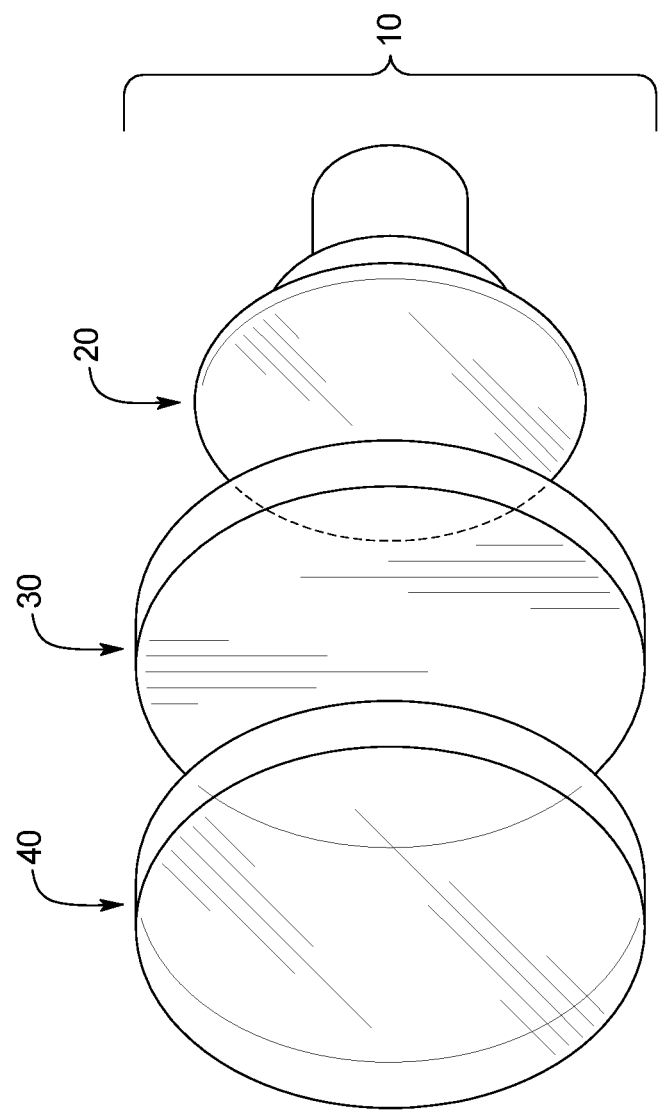
FIG. 1 is an exploded, perspective view of a headlamp of the present application.

FIG. 1 illustrates an example of a hidden photochromic headlamp 10. As shown in FIG. 1, in one embodiment, the headlamp 10 comprises a light source 20, a one-way mirror 30, and a photochromic lens 40. In FIG. 1 the light source 20 is placed behind a one-way mirror 30; when the light source 20 is turned on, it projects light forward through the photochromic lens 40, which is placed in front of the mirror 30. In sequence, from rear to front the main elements of the headlamp 10 are: the light source 20, the one-way mirror 30 and the photochromic lens 40.

Figure 2:
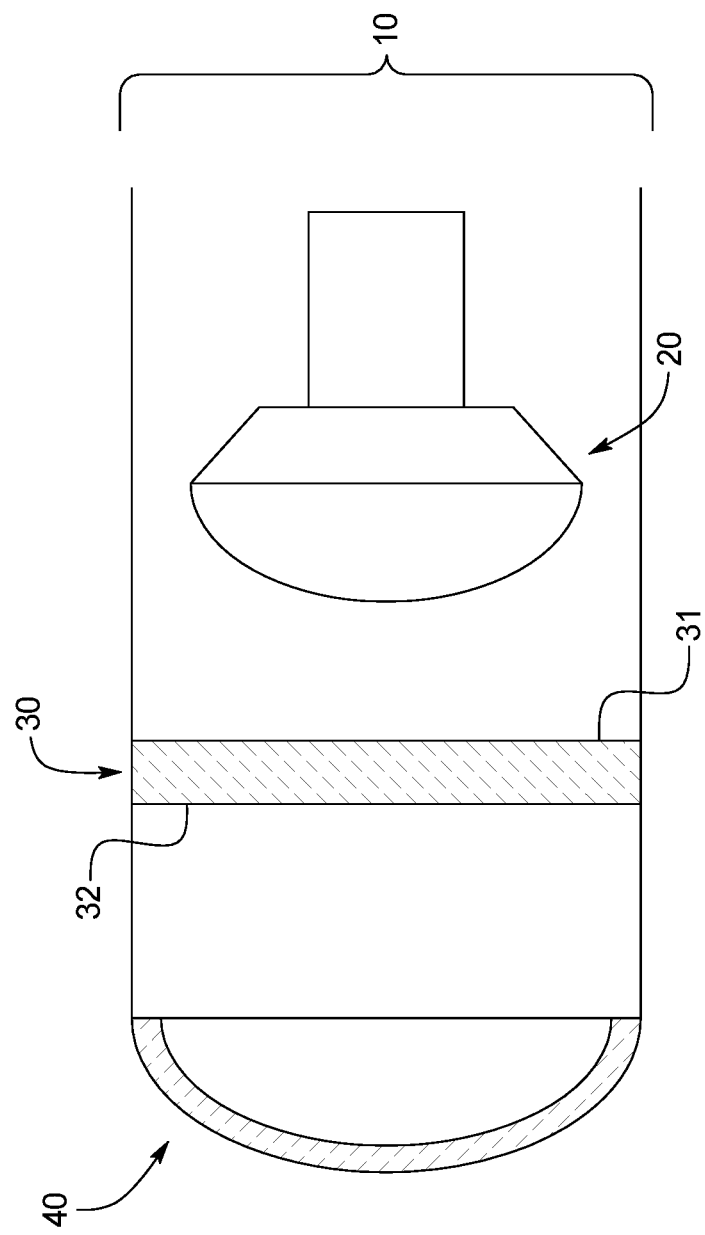
FIG. 2 is a cutaway view of a headlamp of FIG. 1.

FIG. 2 illustrates a cutaway side view of an embodiment of a hidden photochromic headlamp 10. FIG. 2 shows a light source 20 placed behind a one-way mirror 30, with the one-way mirror 30 placed behind a photochromic lens 40. FIG. 2 shows the faces of the one-way mirror: the rear face 31, which faces the light source 20 and the front face 32 which faces the photochromic lens 40. The light source 20, mirror 30 and lens 40 may be placed in sequence, inside a housing 50, making a self-contained and weather-shielded headlamp 10. The housing 50 may be made of any material appropriate for enclosing the internal elements of the headlamp mentioned above. For example, the housing 50 may be made from heat-resistant plastic. Further, the interior surface of the housing may be coated or covered by a white or reflective material or may be non-reflective, as desired or necessary per the design requirements.

This embodiment of the lamp 10, where a light source 20 sits behind a one-way mirror 30 which sits behind a photochromic lens 40 (FIGS. 1. And 2.), allows the proposed device to conceal the light source 20 and make the lamp 10 "invisible" when in full sunlight.

Examples of a light source 20 used in a hidden photochromic headlamp 10 embodiment include, but are not limited to, Halogen lights, Incandescent lights, HID lights (also known as Xenon, Plasma or Arc lights), and LED lights. The examples listed above comprise four headlight types; however the light source 20 may also be any other functionally useful light-emanating device. It should be noted the physical light source 20 and the light it emits may also be colored to match the automobile body upon which they are placed. For example, if a car had an all red body, the LED diode(s) (which act as the light source 20 for the car in this example) may also be red to help further camouflage the headlamp(s) 10. The light source 20 could also emit red colored light to match the theme of the car, producing an aesthetic effect in which (in this example) the all red car emits red light from concealed headlamps 10.

In one embodiment of the hidden photochromic headlamp 10 (FIG. 2), a photochromic lens 40 may be used in concert with a one-way mirror 30 to conceal the light source 20. Photochromic lenses 40 are optical lenses that darken on exposure to specific types of light. Such specific types of light are termed "activating light" and represent certain wavelengths or intensities of light (e.g., ultraviolet light). When activating light hits a photochromic lens 40, the lens 40 is capable of changing shade from transparent to fully opaque. The change in lens 40 color is caused by dyes embedded within the lens 40. One variant of the dye employs silver chloride; however, any functional substitute which enables transition from transparent to opaque may be used with this invention.

The dye(s) embedded within a photochromic lens 40 may, on a molecular level, change shape when exposed to activating light. When light hits the dye, its molecules get bigger and cause darkening of the lens 40. When no longer exposed to activating light, the molecules get smaller and the lens 40 becomes more transparent. This enables the shade of a lens 40 to vary with changes in light exposure.

Figure 4B:
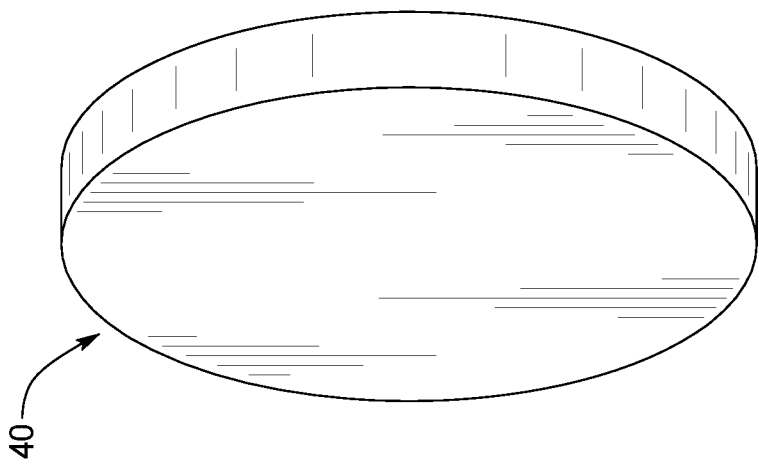
FIG. 4B is a perspective view of a photochromic lens used in the headlamp of FIG. 3 under direct sunlight.

One type of activating light is Ultraviolet light (UV light). Because sunlight is partly composed of UV light, the sun's rays may activate a photochromic lens 40. The photochromic lens 40's reactivity to the sun is useful for an embodiment of the presently disclosed hidden photochromic headlamp 10. While driving during the day in direct sunlight the lens 40 inside of the headlamp 10 would darken (FIG. 4B). The headlamp 10 would appear hidden because the dyes used in the photochromic lens 40 would cause the color of the lens 40 to match the color of a car's body. The lens 40's ability to match the headlamp 10 with the rest of the automobile's finish would help make the headlamp(s) 10 "invisible", like the hide-away headlights of old, but without the moving parts.

While driving during twilight, the decreasingly diminished intensity of the sun's UV rays would cause the lens 40 to gradually transition from opaque, to semi-translucent, to translucent. Finally, at night, with no UV light present, the lens 40 would become transparent (FIG. 4A), and the light source 20 would become fully visible.

The photochromic lens 40 used in an embodiment of the hidden photochromic headlamp 10 may be made of glass, polycarbonate, various types of plastic, or any other suitable material.

The photochromic lens 40 discussed above turns opaque when exposed to sunlight, concealing the lamp 10, however the light source 20's hardware may still be visible through the lens when examined closely. To further increase concealment of the light source 20, a one-way mirror 30 is used in some embodiments of this invention (e.g., FIG. 2). In said embodiment the mirror 30 may work together with the lens 40 to further conceal the lamp 10.

The one-way mirror 30, shown in FIGS. 1 and 2, is typically a sheet of glass or plastic with a thin coating of metal, usually aluminum or silver. The metal coating is applied evenly, but sparsely, and the metal may also be embedded within the glass or plastic. A one-way mirror 30 is often called a "half-silvered" mirror. The name "half-silvered" comes from the fact that only half of the reflective substance needed to make a fully opaque mirror is applied to the half-silvered mirror 30's surface, or embedded in the mirror 30. Because the mirror 30 is at half opacity it will reflect half of the light that it absorbs. A one-way mirror 30 has two sides, also called faces. The light reflected off of each face may affect what a person sees when looking at the mirror 30. When one face of the mirror 30 is illuminated and the other side is relatively dark, a person looking through the darker side can see through the mirror 30 (it appears transparent) as the dark side does not reflect enough light to create a reflection. In contrast, the illuminated side of the mirror 30 looks fully reflective, because enough light is present for the mirror's 30 metallic molecules to create a reflection.

At night when it is dark outside, the light source 20 would be visible through the one-way mirror 30. At night the front face of the mirror 32 faces the dark horizon, so no light is hitting the front face 32. Hence, the front face 32 remains transparent. Consequently, at night, with no activating light present, a person looking from the outside through the front of the hidden photochromic headlamp 10 is able to see the light source 20 because they would see through the transparent side of the mirror 30 (e.g., the darker side of the mirror discussed above). In contrast, during the day, the one-way mirror 30 helps obscure the light source 20. During the day, any sunlight that passed through the photochromic lens 40 would hit the front face 32 of the mirror 30. The sunlight is reflected off of the front face 32 and the resulting reflection would help conceal the light source 20 behind the mirror 30.

Thus, in the embodiment shown in FIG. 2, working from front to back, in direct sunlight the photochromic lens 40 would turn from transparent to fully opaque (shown in FIG. 4B), helping to conceal the headlamp 10; next the front face 32 of the one-way mirror 30 would reflect the remaining UV light coming in through the lens 40 toward the light source 20 and further conceal the light source 20. In the embodiment shown in FIG. 2, the lens 40 and mirror 30 successfully work in tandem to conceal the headlamp 10. Said hidden headlamp 10 effect is illustrated in FIG. 5A.

Figure 3:
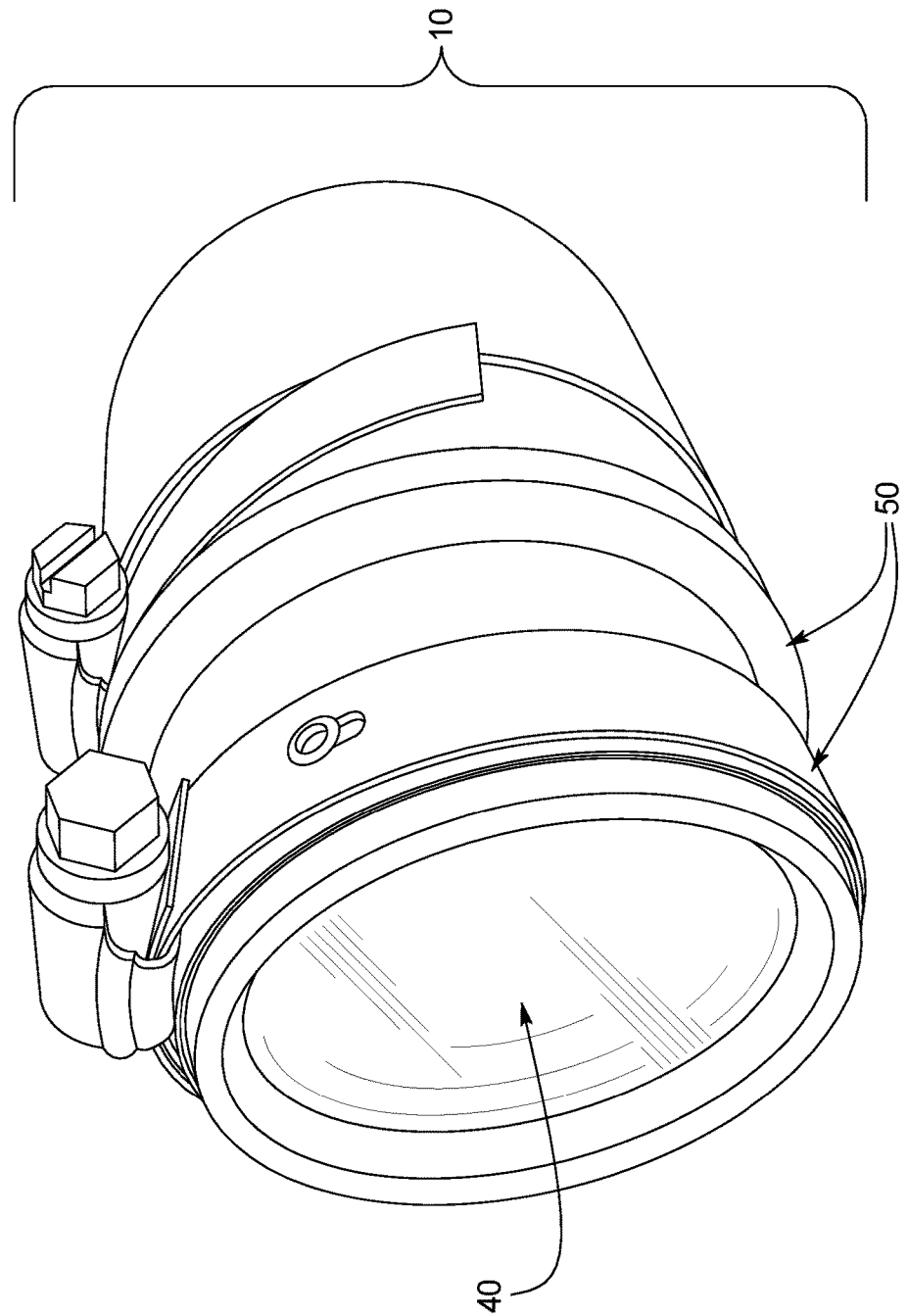
FIG. 3 is a perspective view of an embodiment of the headlamp of FIG. 1.

FIG. 3 illustrates a perspective view of an embodiment of the hidden photochromic headlamp 10. In the embodiment shown, the headlamp 10 is placed under incandescent light. In the embodiment shown the housing 50 and photochromic lens 40 are visible.

Figure 4A:
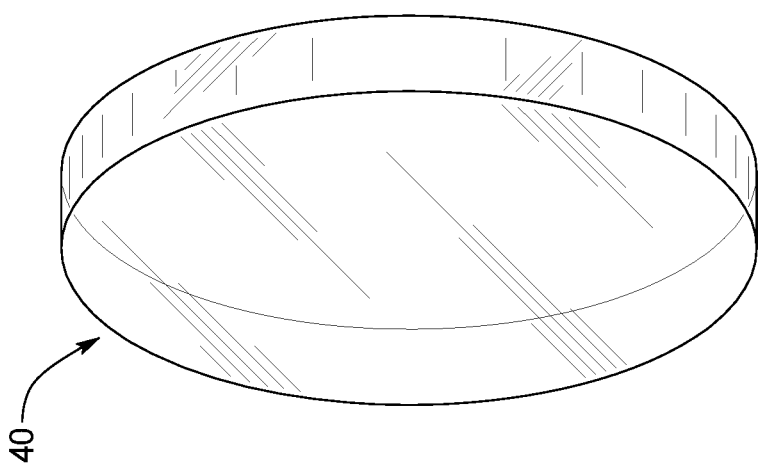
FIG. 4A is a perspective view of a photochromic lens used in the headlamp of FIG. 3 under incandescent light.

FIG. 4A is a perspective view of a photochromic lens 40 placed under incandescent light. The shade of the lens 40 is transparent because the lens 40 is not exposed to UV light. This feature is useful because a lens 40 used in an embodiment of the hidden photochromic headlamp 10 would remain transparent during nighttime driving, or under artificial light found in a garage or service station.

FIG. 4B is a perspective view of the same lens illustrated in FIG. 4A, exposed to direct sunlight. The shade of the lens 40 is opaque because the lens 40 is exposed to UV rays from the sun. The opaque shade of the lens 40 helps to conceal the light source 20.

FIG. 5A is a front view of an embodiment of a headlamp 10 exposed to direct sunlight. The photochromic lens 40 is visible at the front of the headlamp 10, and is opaque. The one-way mirror 30 sits behind the photochromic lens; the light source 20 sits behind the mirror 30. Housing 50 surrounds the headlamp 10. The light source 20 in FIG. 5A is switched off, demonstrating possible daytime usage. FIG. 5A illustrates almost full concealment of the light source 20, and shows how the assembly of the mirror 30 and lens 40 hides the headlamp 10.

Figure 5B:
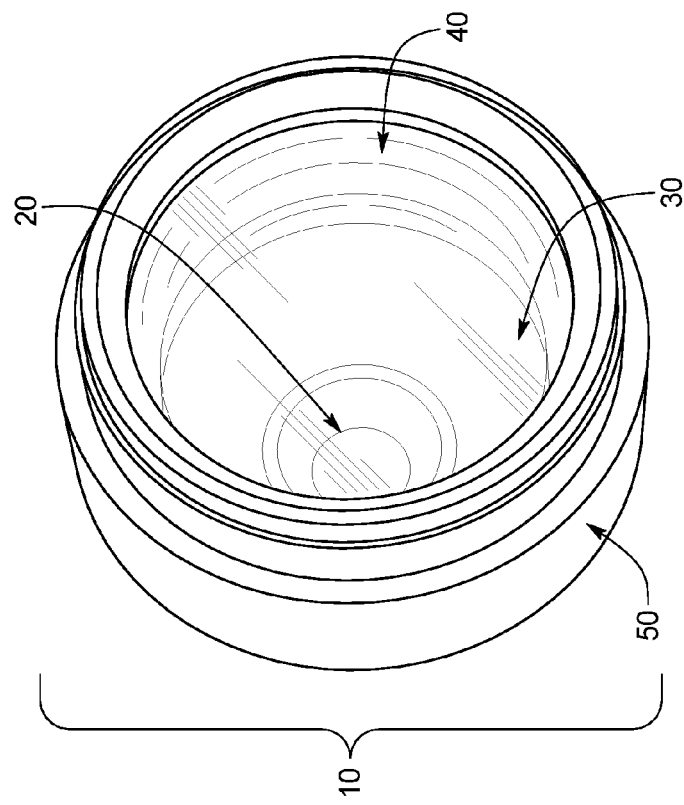
FIG. 5B is a perspective view of the headlamp of FIG. 3 exposed to direct sunlight.
Figure 5A:
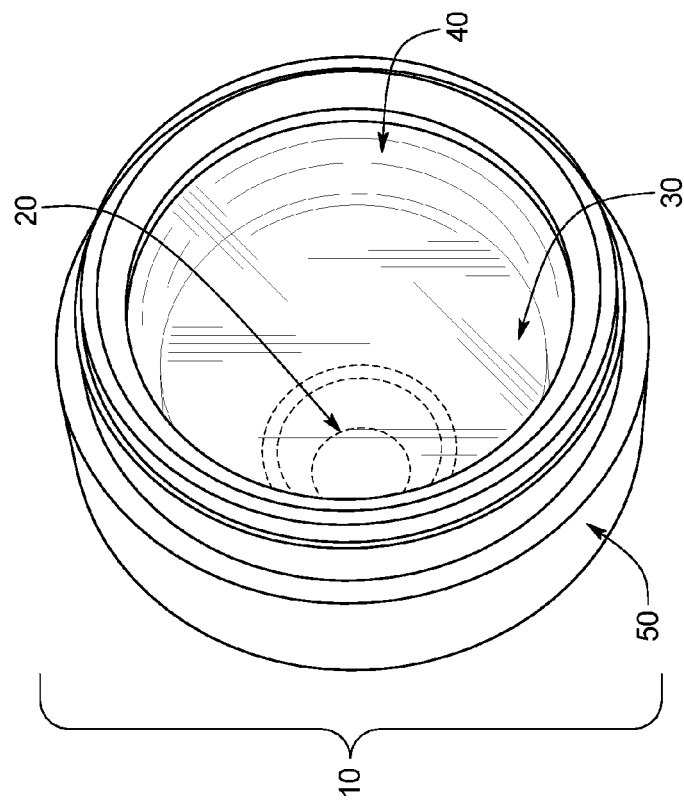
FIG. 5A is a front view of the headlamp of FIG. 3 exposed to direct sunlight.

FIG. 5B is a perspective view of a headlamp 10 with a semi-transparent lens 40. In FIG. 5B the sunlight is less intense than in FIG. 5A so the lens 40 appears semi-transparent. The semi-transparency is evident in FIG. 5B because the interior of the housing 50 is visible through the lens 40.

Figure 6:
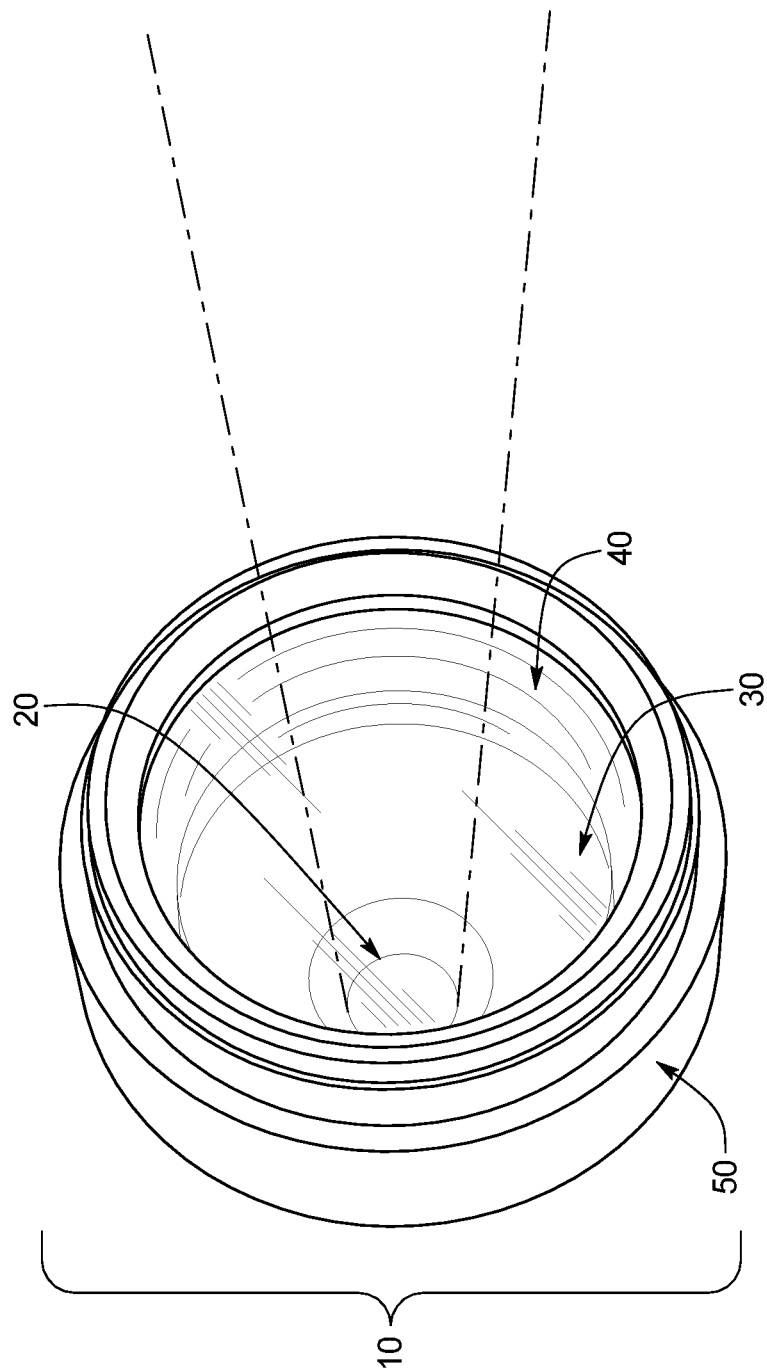
FIG. 6 is a front view of an illuminate the headlamp of FIG. 3.

FIG. 6 is a front view of an illuminated headlamp 10. Each component is visible. The light source 20 is illuminated and is visible at the rear of the lamp, the half-silvered mirror 30 is visible in front of the light source 20, and the photochromic lens 40 is visible in front of the half-silvered mirror 30. The lens 40 is semi-transparent allowing the inside of the headlamp 10 to be seen. FIG. 6 demonstrates that the light source 20 can be seen at night, or with non-activating light present, despite the presence of the one-way mirror 30 and photochromic lens 40. Additionally, the housing 50 is shown surrounding the lamp and allows the embodiment to be self-contained, and shielded from the elements.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. An automobile headlamp comprising:
   a light source;
   a photochromic lens; and
   a one-way mirror positioned between the light source and the photochromic lens such that when viewing the light source through the photochromic lens, the one-way mirror conceals at least a portion of the light source.

2. The automobile headlamp of claim 1, further comprising a housing including an opening, wherein the housing surrounds the one-way mirror and the photochromic lens is located along the opening such that light emitted from the light source passes through the one-way mirror and exits the housing through the photochromic lens.

3. The automobile headlamp of claim 2, wherein the housing includes a reflective lining.

4. The automobile headlamp of claim 1, wherein the photochromic lens is activated by ultraviolet light to increase its opacity.

5. The automobile headlamp of claim 4, wherein, when the photochromic lens is activated to increase its opacity, a color of the photochromic lens matches a color of an automobile body into which the automobile headlamp is mounted.

6. The automobile headlamp of claim 1, wherein the light source emits light of a color which matches a color of an automobile body into which the automobile headlamp is mounted.

7. The automobile headlamp of claim 1, wherein the light source is a color which matches a color of an automobile body into which the automobile headlamp Is mounted.

8. An automobile headlamp installed in an automobile comprising:
   a light source positioned to emit light through a photochromic lens, wherein, when the photochromic lens is activated by ultraviolet light to increase its opacity, a color of the photochromic lens matches a color of an automobile body into which the automobile headlamp is mounted.

9. The automobile headlamp of claim 8, further comprising a housing including an opening in which the photochromic lens is located such that the light emitted from the light source exits the housing through the photochromic lens.

10. The automobile headlamp of claim 9, further comprising a one-way mirror positioned between the light source and the photochromic lens.

11. The automobile headlamp of claim 10, wherein the one-way mirror is positioned such that when viewing the light source through the photochromic lens, the one-way mirror conceals at least a portion of the light source.

12. The automobile headlamp of claim 9, wherein the housing includes a reflective lining.

* * * * *